(12) United States Patent
Panchal et al.

(10) Patent No.: US 11,687,873 B2
(45) Date of Patent: Jun. 27, 2023

(54) SYSTEM FOR AUTOMATED MATERIAL MASTER DATA HARMONIZATION

(71) Applicant: Verdantis Inc., Princeton, NJ (US)

(72) Inventors: Digesh Panchal, Mumbai (IN); Nitin Patil, Mumbai (IN); Amit Shinde, Mumbai (IN)

(73) Assignee: Verdantis Inc., Princeton, NJ (US)

( * ) Notice: Subject to any disclaimer, the term of this patent is extended or adjusted under 35 U.S.C. 154(b) by 97 days.

(21) Appl. No.: 16/985,917

(22) Filed: Aug. 5, 2020

(65) Prior Publication Data

US 2020/0364654 A1  Nov. 19, 2020

Related U.S. Application Data

(63) Continuation-in-part of application No. 14/306,383, filed on Jun. 17, 2014, now abandoned.

(30) Foreign Application Priority Data

May 7, 2014  (IN) .......................... 1579/MUM/2014

(51) Int. Cl.
| | | |
|---|---|---|
| G06F 16/00 | (2019.01) | |
| G06Q 10/087 | (2023.01) | |
| G06F 16/28 | (2019.01) | |
| G06K 7/10 | (2006.01) | |
| G06F 16/9538 | (2019.01) | |
| G06F 16/955 | (2019.01) | |
| G06F 16/215 | (2019.01) | |

(52) U.S. Cl.
CPC ......... *G06Q 10/087* (2013.01); *G06F 16/215* (2019.01); *G06F 16/285* (2019.01); *G06F 16/9538* (2019.01); *G06F 16/9554* (2019.01); *G06K 7/10366* (2013.01)

(58) Field of Classification Search
None
See application file for complete search history.

(56) References Cited

U.S. PATENT DOCUMENTS

| | | | | |
|---|---|---|---|---|
| 6,473,898 | B1 * | 10/2002 | Waugh ................. | G06F 16/951 |
| | | | | 707/E17.108 |
| 2014/0108206 | A1 * | 4/2014 | Chechuy ............ | G06Q 30/0603 |
| | | | | 705/27.1 |

* cited by examiner

*Primary Examiner* — Anhtai V Tran
(74) *Attorney, Agent, or Firm* — Preston Smirman; Smirman IP Law, PLLC

(57) ABSTRACT

A system for automated material master data harmonization that is extremely configurable and easy-to-use solution to standardize, normalize, attribute, rationalize and enrich the organization's material master data using embedded knowledge that leverages enterprise knowledge assets. The system provides various customer centric systems and processes by providing harmonization of data with dependencies of important embodiments such as data classification and MFR-MPN extraction that are not dependent on any other stage. Attribute extraction is dependent on data classification and data sheet definition. Post processing is dependent on data classification, data sheet definition and attributes extraction. Identify L2 dups is dependent on data classification, data sheet definition, attribute extraction and post processing. Non-Source enrichment and Identify L1 dups are dependent on MFR-MPN extraction.

6 Claims, 10 Drawing Sheets

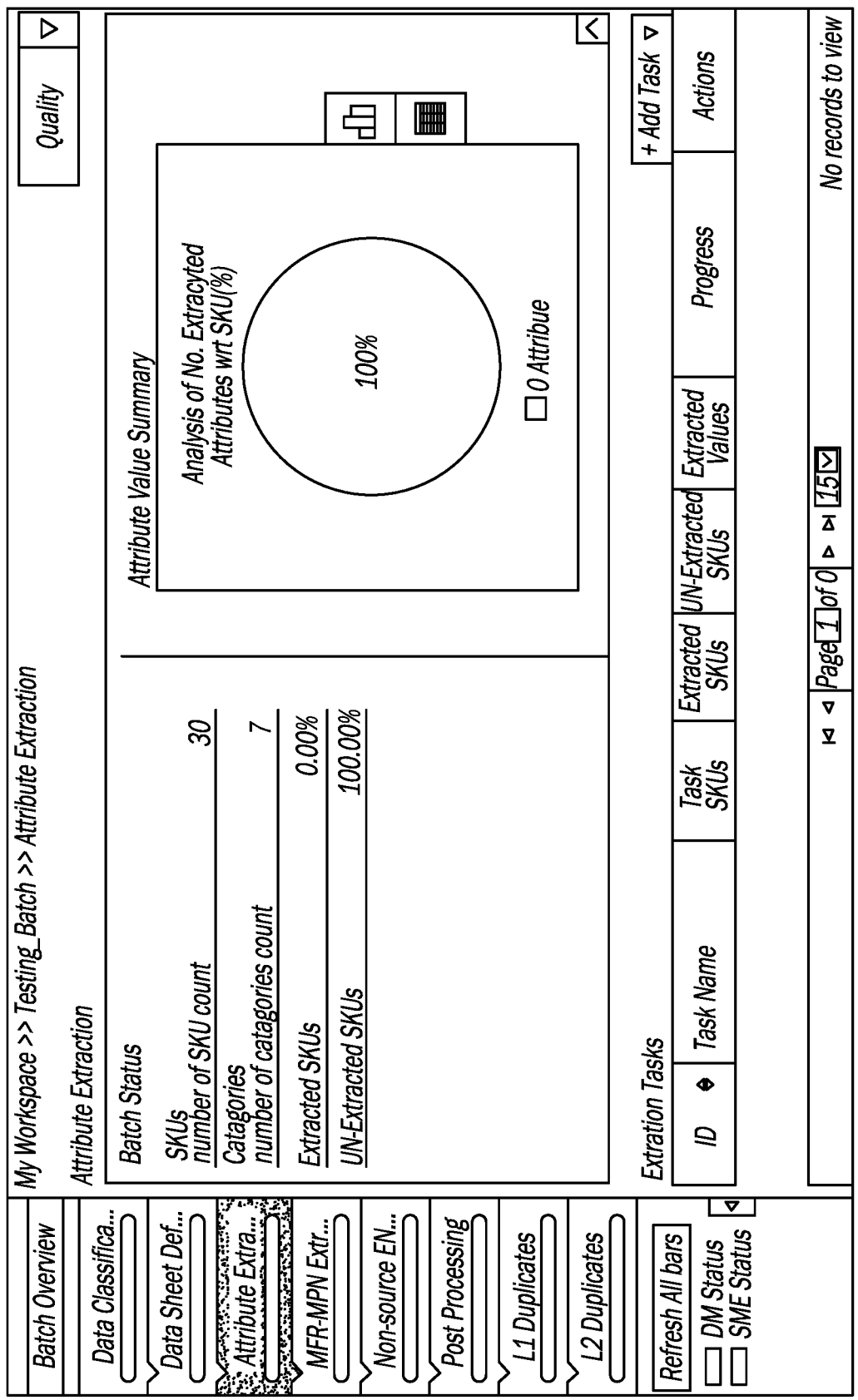
FIG-1 (PART 1)

Extraction Tasks   + Add Tasks ▽

New Task Name:
AE_UNSPSC 30171500

+ Add Task ◁

UNSPSC ▽

Select All
26101100
27111602
31161600
31171504

Input Fields    Criteria

🗑 UNSPSC    30171500

Done    Cancel

Extration Tasks    + Add Task ▽

| ID ● | Task Name | Task SKUs | Extracted SKUs | UN-Extracted SKUs | Extracted Values | Progress | Actions |
|---|---|---|---|---|---|---|---|
| 4 | AE_UNSPSC 30171500 | 1 | 1 | 1 | 1 | ▭ Extract | ⊘ ▤ |

*FIG - 1 (PART 2)*

My Workspace >> Testing_Batch >> Attribute Extraction >> Attribute Quality Check
Attribute Quality Check

| | Quality ▽ |
|---|---|

ⓘ Please press 'Enter Key' to save editable field.

⊡ Select Columns ✎ Record Sampling

| ID | Short Description | Manufacturer Part Number 1 | Code | Title |
|---|---|---|---|---|
| Filter | Filter | Filter | Filter | Filter |
| 103 61 | BRG, BALL SKF, 6024-3RS1 | 6024-2RS1 | 31171504 | BALL BEARINGS |
| 103 62 | BRKR, CKT; FAL3601513M, 3-POLE, 15A | FAL3601513M | 39121601 | CIRCUIT BREAKERS |
| 103 63 | BRG, BALL 0.8750 UP, SKF 6305-2ZJEM | 6305-2ZJEM | 31171504 | BALL BEARINGS |
| 103 65 | GB-24020-88 GNRL BALL BRG | GB-24020-88 | 31171504 | BALL BEARINGS |
| 103 66 | GB-24020-88, GNRL,BRG, BALL,STANDARD | GB-24020-88 | 31171539 | BEARING BALL |
| 103 67 | MTR,7 1/2 HP, BALDOR CEWDM3710T | CEWDM3710T | 26101100 | ELECTRIC ALTERNATING MOTORS |
| 103 68 | MTR,7 1/2 HP, BALDOR CEWDM3710T | CEWDM3710T | 26101100 | ELECTRIC ALTERNATING MOTORS |
| 103 69 | BRKR, CKT, SQUARE D, FAL36040, 3-POLE | FAL36040 | 39121601 | CIRCUIT BREAKERS |
| 103 70 | BLT,VEE MULT,GATES,B-50,52.800 OC | B-50 | 31161600 | BOLTS |

Attribute Values for ID: 10362

| Attribute Name | Attribute Value |
|---|---|
| SHORT NAME | BREAKER, CIRCUIT |
| TYPE | |
| ADAPTER TYPE | |
| ADAPTER TYPE | |
| NUMBER OF PHASES | |
| SIZE | 3601513m |
| NUMBER OF POLES | |
| CURRENT RATING | 15a |
| VOLTAGE RATING | |
| MOUNTING TYPE | |
| TERMINAL TYPE | |
| ADDITIONAL INFO | |

Red - Critical Attributes
Black - Non-critical Attributes

Mark All Flags | << Back to Attribute Extraction

FIG-2 (PART 1)

| 103 89 | BRKR, 1 POLE, ALLEN BRADLEY |
|---|---|

| Add To Attribute Table: | | |
|---|---|---|
| SHORT NAME | > | |
| TYPE | > | Add to this Batch |
| ADAPTER TYPE | > | Add to this Catagory |
| ADAPTER TYPE | > | Add to this record |
| NUMBER OF PHASES | > | |

| Add To Attribute Table: | | |
|---|---|---|
| TYPE | > | Add to this Batch |
| ADAPTER TYPE | > | Add to this Catagory |
| ADAPTER TYPE | > | Add to this record |

*FIG - 2*   *(PART 2)*

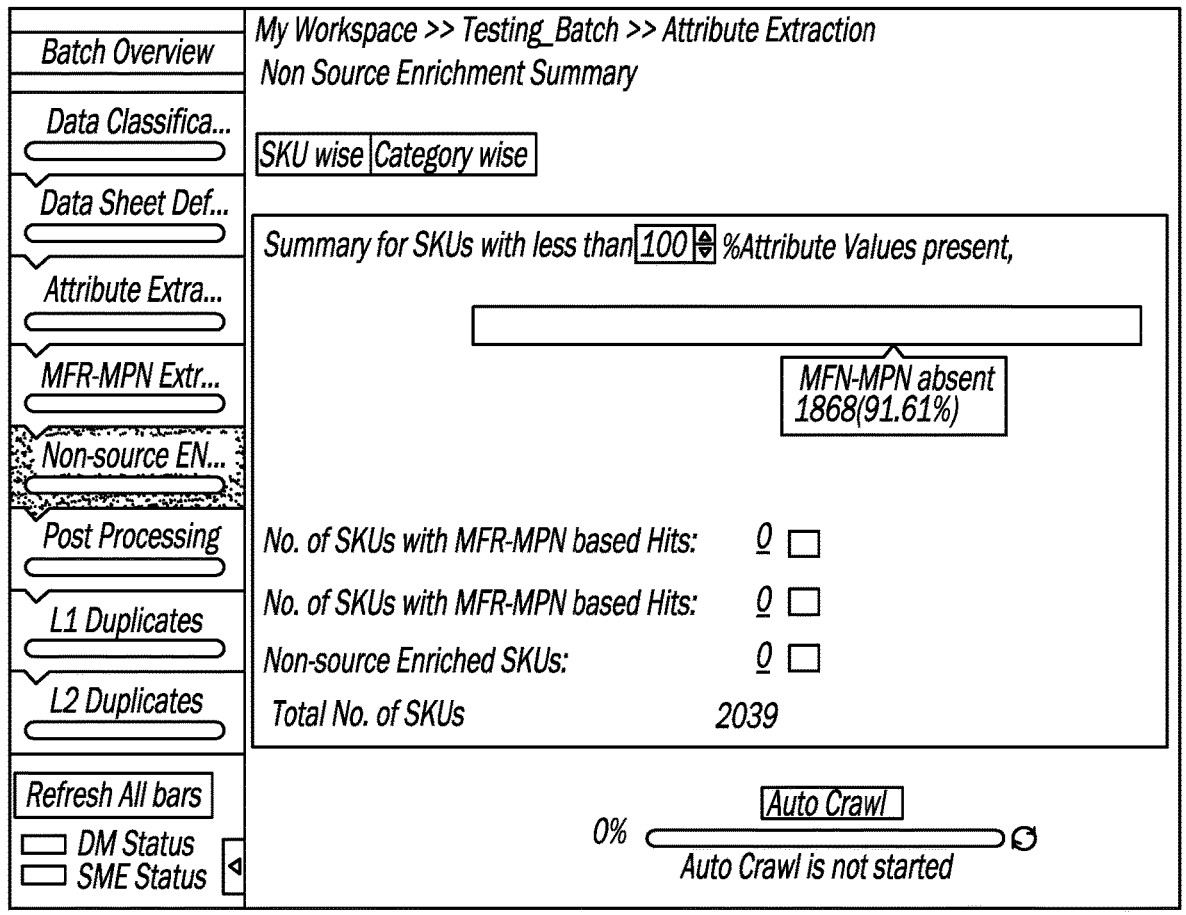
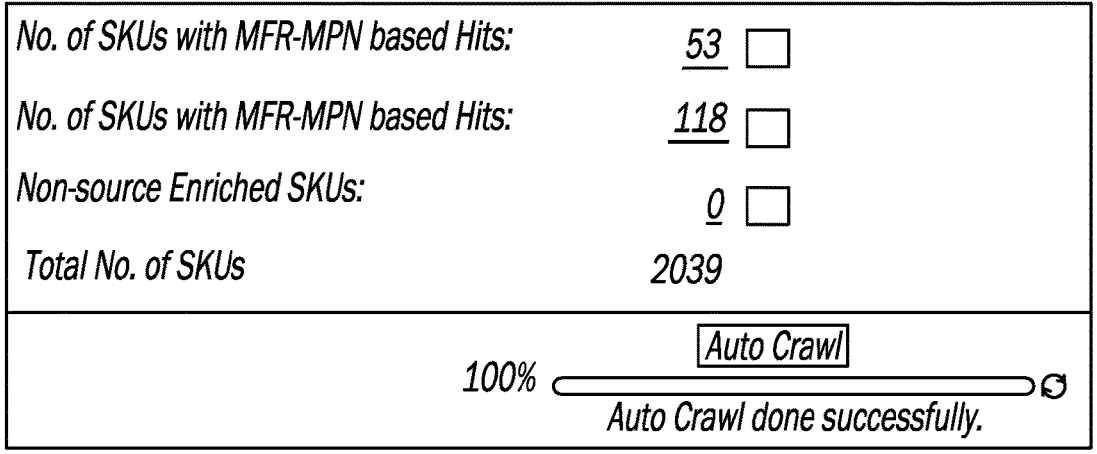
FIG - 3

Summary for SKUs with less than 100 %Attribute Values present,

| SKU Count | Category | Attribute Values Present | MFR-MPN based Hits | MFN-MPN but No Hits | Non-Source Enriched SKUs |
|---|---|---|---|---|---|
| 18 | 43211501-Computer servers | 28% 4/14 | 3 | 3 | 0 |
| 11 | 43201803-Hard disk drives | 54% 6/11 | 4 | 3 | 1 |
| 10 | 43211507-Desktop computers | 53% 7/13 | 8 | 0 | 0 |
| 9 | 43211900-Computer displays | 38% 5/13 | 1 | 0 | 1 |
| 8 | 43211708-Computer mouse or trackballs | 50% 6/12 | 6 | 1 | 0 |
| 8 | 43211706-Keyboards | 63% 7/11 | 7 | 0 | 0 |
| 8 | 43211503-Notebook computers | 75% 15/20 | 4 | 0 | 0 |
| 6 | 43212110-Multi function printers | 20% 2/10 | 3 | 0 | 0 |
| 5 | 43211902-Liquid crystal display LCD panels or monitors | 30% 4/13 | 3 | 0 | 0 |

*FIG-4*

My Workspace >> Test >> Non-Source Enrichment >> Enriched Results

Enriched Results

ⓘ Please press 'Enter Key' to save editable field.

⊘ Enrich ⊕ Bypass ⓘ Pending

SKUs with MFR-MPN based Hits

| Material | Classification | Long Description | MFR | MPN | Status | QC Flag |
|---|---|---|---|---|---|---|
| Filter | Filter | Filter | Filter | Filter | All ▾ | All ▾ |
| 10364 | Notebook computers | Laptop, Lenovo, Thinkpad, LED, 1366x768, Z580,500 GB, HDD, 15.6", Windows 8, 4 GB DDR3, Intel Core i5 3230 M, Integrated Graphics, wifi 802.11 a/b/g/n, Bluetooth, Speakers-yes, 2 Ports, Black, 6 cell, Power Supply Included | lenovo | 1366x768 | ⓘ | ✓✓ |
| 10363 | Notebook computers | 1366x768, N00300ESC A0CIN, 256 GB, HDD 15.6", Windows 8, 4 GB DDR3, Intel Core i3 2326M, NVidia Geforce 3400 M, Wifi 812.11 a/b/g/n, Bluetooth, Speakers-yes, Web, Camera-yes, 3 Ports, Silver, 4 cell, Power Supply Included | samsung | 1366x768 | ⓘ | ✓✓ |

*FIG-5 (PART 1)*

Datasheet of Material ID 10295 — MFR-MFN Details

| Attribute Name | Source Attribute Value | Web Attribute Value |
|---|---|---|
| SHORT NAME | Drive, Hard disk | |
| TYPE | | |
| MODEL NUMBER | | |
| HARD DRIVE TYPE | portable | |
| HARD DRIVE TECHNOLOGY | hdd | |
| CAPACITY | 500gb | |
| SPINDLE SPEED | | |
| INTERFACE | usb | |
| PLATFORM | | |
| FORM FACTOR | | |

Web Search sony hd-eg5b-50 Drive Hard Disk

SONY HD EG5B-50 HDD Portable Hard Drive - 500 GB - Black...
www.ebay.co.uk/itm/SONY-HD-EG5B-50-HDD-...
SONY HD EG5B-50 HDD Portable Hard Drive - ...

SONY HD EG5B-50 Portable Hard Drive - 500 GB, Black
www.pcworld.ie/Mobile/Product/Sony-HDEG5-5....
SONY HD EG5B-50 Portable Hard Drive - 500

SONY HD EG5B-50 Portable Hard Drive - 500 GB, Black
www.currys.ie/Mobile/Product/Sony-HDEG5...
enjoy bazing fast, secure and reliable storag...

SONY 500GB USB 3.0 2.0 External Hard Disk Drive | eBay
www.ebay.in/itm/SONY-500GB-USB-3-0-2-0-E...
SONY 500GB USB 3.0 2.0 External Hard Disk Dr...

SONY HD EG5B-50 Portable Hard Drive - 500 GB, USB 3.0
www.hotukdeals.com/deals/sony-hd-eg5b-50-...
SONY HD EG5B-50 Portable Hard Drive - 500G...

sony+hard+disk+drive | eBay - Electronics. Cars. Fashion...

FIG-5 (PART 2)

| Classification | Long Description | MFR | MPN | Status |
|---|---|---|---|---|
| Filter | Filter | Filter | Filter | All ⌄ |
| Hard disk drives | 320 GB Hitachi Travelstar Internal hard Drive 2.5" Laptop HDD 5400RPM (Z5K320) SATA | hitachi | 2.5" | ① |
| Hard disk drives | 320 GB Hitachi Travelstar Internal hard Drive 2.5" Laptop HDD 5400RPM (Z5K320) SATA | hitachi | 2.5" | ① |
| Hard disk drives | 500GB WESTERN DIGITAL SATA 2.5" HARD DRIVE INTERNAL 500GB HDD WD5000BPVT WD BLUE SATA FOR LAPTOP NETBOOK | western digital | 2.5" | ⊙ |
| Hard disk drives | 500GB WESTERN DIGITAL SATA 2.5" HARD DRIVE INTERNAL 500GB HDD WD5000BPVT WD BLUE SATA FOR LAPTOP NETBOOK | western digital | 2.5" | ⊙ |
| Hard disk drives | SONY-HD-EG5B-50 HDD Portable Hard Drive - 500 GB - Black - USB Powered - New | sony | hd-eg5b-50 | ⊘ |
| Hard disk drives | SONY-HD-EG5B-50 HDD Portable Hard Drive - 500 GB - Black - USB Powered - New | sony | hd-eg5b-50 | ⊘ |

*FIG - 6*

SYSTEM FOR AUTOMATED MATERIAL MASTER DATA HARMONIZATION

CROSS-REFERENCE TO RELATED APPLICATION

The instant application is a continuation in part of U.S. patent application Ser. No. 14/306,383, filed Jun. 17, 2014, pending, and claims priority to Indian Patent Application Serial No. 1579/MUM/2014, filed May 7, 2014, pending, the entire specifications of both of which are expressly incorporated herein by reference.

FIELD OF THE INVENTION

The present invention relates generally to data processing and to distributing data in data management systems, and more particularly to a system for automated material master data harmonization.

BACKGROUND OF THE INVENTION

Information technology ("IT") environments can consist of many different systems performing processes, such as business processes, on common master data. The different systems can be part of the same entity or can be part of different entities, such as vendors or contractors. The master data used for the processes can be stored in a number of different locations, systems, and/or incompatible formats. Branch offices of a company can work largely independently, adopted companies can introduce new software solutions to a group of affiliated companies, and systems from different vendors can be linked. Different master data models can make it difficult to integrate business processes in these scenarios.

Master data can become trapped and siloed in different systems. Master data that is not aligned across an IT environment can lead to data redundancies and irrelevant or incorrect information.

Businesses today are more data and analytics driven, and many of them seek enrichment of their internal data records with data from data sources available from the manufacturer, the Internet, and any other information. The goal of this exercise is almost always to get specific descriptions about the current inventory that aids in spend-analysis.

Hence, harmonization classifies the data to begin with, and moves to extract specific attributes and manufacturer information. There is a process to search for alternative data sources on the Internet as well. All of these processes converge to generate more specific descriptions of the item.

Because the data is processed in quite a few ways, data ambiguity is almost negligible and finding duplicate records is easier, therefore there exists a need to have a system to harmonize and attempt to find duplicates at two levels, one being for the manufacturer information, and the other for attribute values in order to avoid a negligible margin of error.

SUMMARY OF THE INVENTION

The main object of the present invention is to provide a system for a one-stop solution for cleansing and enrichment of historical master data.

Yet another object of the present invention is to improve master data quality transforming the data into a productivity lever that drives organizational optimization and improved productivity.

It is another object of the present invention is to overcome data quality challenges such as high volume of data, duplicate entries, multiple languages, non-uniform commodity coding standards, poorly or insufficiently classified data, incomplete data (e.g., missing part numbers), poorly structured descriptions (e.g., inconsistent or missing specifications) and the unique characteristics of parts (e.g., especially MRO) data.

It is yet another object of the present invention to provide a system which is configurable and easy-to-use solution to standardize, normalize, attribute, rationalize and enrich the organization's material master data using embedded knowledge that leverages enterprise knowledge assets.

In accordance with one embodiment of the present invention, a system for harmonizing material master data is provided, comprising:

an automated material master data harmonization system operably associated with a database repository stored on a computer hard drive, comprising:
    an attribute extraction sub-system;
    an attribute quality check sub-system;
    a non-source enrichment sub-system; and
    a data enrichment sub-system;
wherein enriched results, with attribute values for harmonization of data with dependencies including data classification and manufacturer part number (MFR-MPN) extraction, are not dependent on any other stage;

wherein the attribute extraction sub-system shows the number of total items denoted as a stock keeping unit (SKU), along with a number of categories having a percentage of SKUs for which the attribute values have been extracted and for those that are un-extracted;

wherein the attribute extraction sub-system extracts and displays attributes of an item that are for generating an enriched description by harmonizing and enabling scanning of short and long descriptions along with relevant input data fields specified during importation of the batch data and specifying criteria to extract attributes;

wherein the data enrichment sub-system enables enrichment of the SKUs with the attribute values found from the Internet, thereby the results that are directly obtained on searching the MFR-MPN match are classified as hits, wherein the hits are displayed on a screen and indicated by a first symbol, and results obtained that do not directly return attribute based values are classified as no hits, wherein the no hits are displayed on the screen and indicated by a second symbol.

In accordance with one aspect of this embodiment, the attribute quality check sub-system enables a user to define checks such that, if the attribute values are not extracted for certain attributes, the user can specify those attribute values from a record or by entering them manually in an attribute table on a right side, wherein the attribute values that the user specifies for an attribute from the record are applied to the attribute table in either batch wise, wherein the attribute values are added to the attribute table for all available batches or by category wise, wherein the attribute values are added to the attribute table for a relevant category or by record wise, wherein the attribute values are added to the attribute table only for a respective record.

In accordance with one aspect of this embodiment, in order to specify the attribute values, a required text is selected from a description field required for extraction including a short description, whereby adding an attribute to a given table causes a pop up to be displayed that has all attributes that are defined for a data sheet to which the value is be added, in either of batch, category and record ways.

In accordance with one aspect of this embodiment, the non-source enrichment sub-system enables enrichment of the input data using multiple data sources present on the Internet by searching the Internet for a MFR-MPN match and displaying the findings thereby to analyze and either enrich the data attributes with the ones found on the Internet or to bypass the Internet-found attributes and retain the source information.

In accordance with one aspect of this embodiment, the number of SKUs with MFR-MPN based hits show the number of SKUs, whereas the MFR-MPN based search has returned attribute based results similarly, the number of SKUs has MFR-MPN but no hits show the number of SKUs, wherein the MFR-MPN match exists but the MFR-MPN based search has not returned any relevant results and the non-source enriched SKUs shows the number of SKUs that have been enriched using the attribute values found from the Internet.

In accordance with one aspect of this embodiment, the enriched results, the attribute values on a website are used as a web attribute value for the record to be enriched, thereby a user is able to view the records that have the same MFR-MPN match are affected and records that have been enriched.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 is a screen shot of an attribute extraction page showing the number of total items (hereinafter referred to as "SKU") or SKUs along with the number of categories. It also shows the percentage of SKUs for which the attribute values have been extracted and for those that are unextracted.

FIG. 2 is a screen shot of an attribute quality check, wherein the attributes that are marked in highlighting (e.g., colored red) are critical attributes for that record, as defined in the data sheet.

FIG. 3 is a screen shot of non-source enrichment showing the total number of SKUs with the number of SKUs that have been searched on the Internet. It is also shows the number of SKUs that have been enriched using the non-source data from the Internet. The searches on the Internet for the SKUs are segregated into Hits and No Hits based on whether results are obtained or not. The data will be populated after the search on the Internet is done using auto crawl.

FIG. 4 is a screen shot of data enrichment by categories showing all SKUs segregated category wise, as well as the percentage of attribute values present.

FIG. 5 is a screen shot showing enriched results with its attribute values on that website, wherein these values could be used as a web attribute value for the record to be enriched.

FIG. 6 is a screen shot showing records that have the same MFR-MPN match are affected and records that have been enriched are denoted by the symbol  and the ones that are bypassed are denoted by the symbol . Pending (e.g., neither bypassed nor enriched) records are denoted by the symbol .

DETAILED DESCRIPTION OF THE INVENTION

Figure 7:
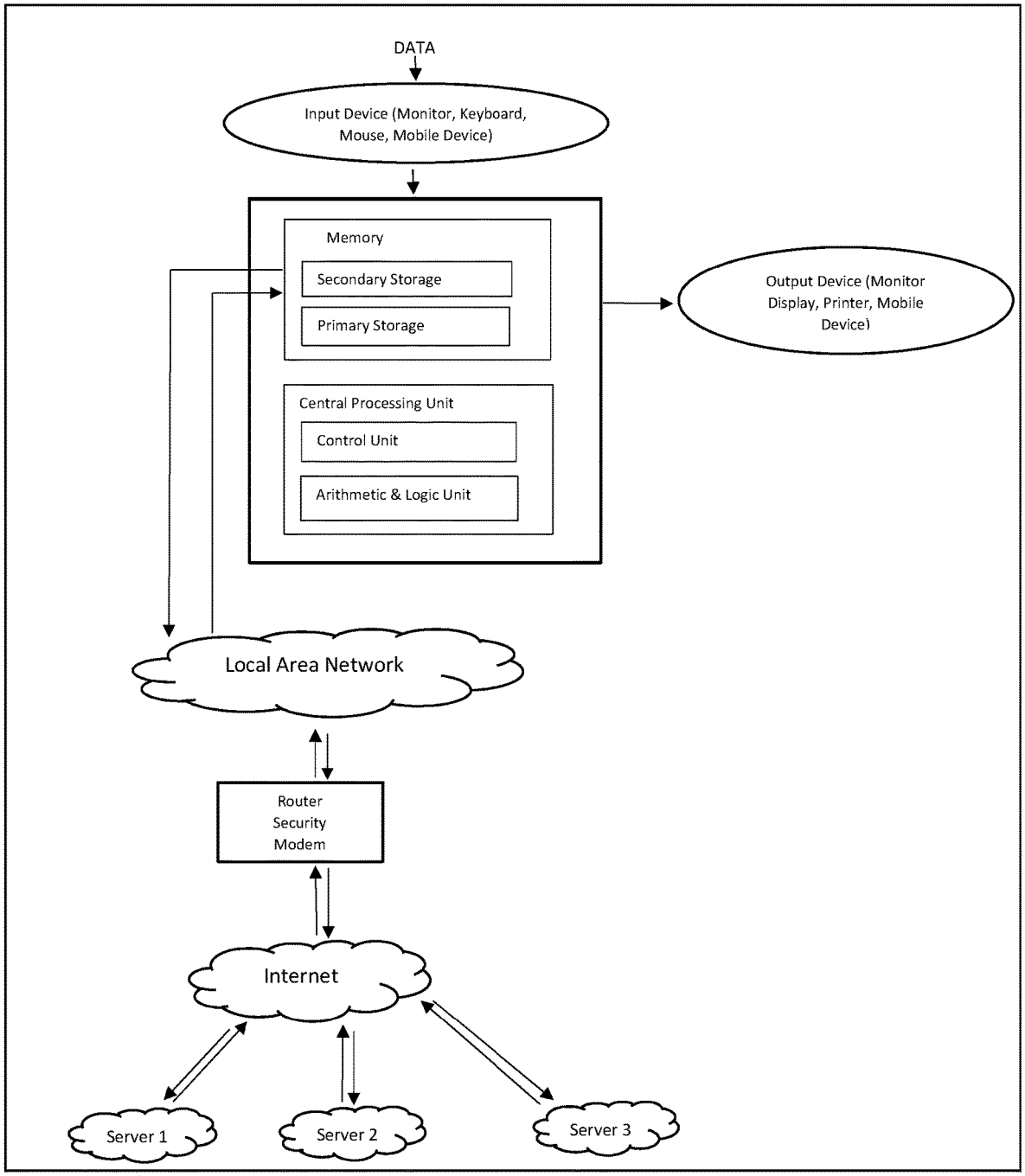
FIG. 7 is an illustrative schematic showing the flow of data/information received by the computer through its input device and the data/information received by the user through the output device.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

The present invention provides a system for automated material master data harmonization that is extremely configurable and easy-to-use solution to standardize, normalize, attribute, rationalize and enrich the organization's material master data using embedded knowledge that leverages enterprise knowledge assets. As previously noted, it is well-known that fetching different data source for data enrichment is a real challenge. Although, enormous data sources are available on Internet but collating them to enrich the data description is a real challenge.

The present invention provides various customer centric systems and processes by providing harmonization of data with dependencies of important embodiments of the present invention such as data classification and MFR-MPN extraction are not dependent on any other stage; attribute extraction is dependent on data classification and data sheet definition. Post processing is dependent on data classification, data sheet definition and attributes extraction. Identify L2 dups is dependent on data classification, data sheet definition, attribute extraction and post processing. Non-Source enrichment and Identify L1 dups are dependent on MFR-MPN extraction.

As shown in FIG. 1, there is provided an attribute extraction step showing the number of total items (hereinafter refers to as SKU) along with the number of categories. It also shows the percentage of SKUs for which the attribute values have been extracted and for those that are unextracted. Thus, an attribute is a technical characteristic of an item. An attribute helps distinguish one item from the other. For example, a roller bearing and a ball bearing are of the same category i.e., bearing; however, the attributes of both types of bearings differ in one being a roller type and the other a ball type. This step enables extracting and displaying the attributes of an item that will help in generating an enriched description by harmonizing enabling scanning the short and long descriptions along with relevant input data fields specified during the import of the batch data as well specifying certain criterions to extract attributes. As illustrated in FIG. 1, attributes can be extracted for a particular item or for group of items together by adding a task for extraction.

Further, as shown in FIG. 2, wherein it illustrates an attribute quality check wherein the attributes that are highlighted (e.g., marked in red) are critical attributes for that record, as defined in the data sheet. Thus, if attribute values are not extracted for certain attributes, a user can specify those values from the record or by entering them manually in the attribute table on the right. The values that user specify for an attribute from the record is applied to the attribute table in either batch wise wherein the attribute values are added to the attribute table for all the available batches and or by category wise wherein the attribute values are added to the attribute table for relevant category and or by record wise wherein the attribute values are added to the attribute table only for respective record.

In order to specify the attribute values, the required text is selected from the description field required for extraction such as a short description. For adding an attribute to the given table, a pop up is displayed that has all attributes that are defined for a data sheet to which the value is be added, in either of batch, category and record ways.

Further, as shown in FIG. 3, non-source enrichment showing the total number of SKUs with the number of SKUs that have been searched on the Internet; it is also shows the number of SKUs that have been enriched using the non-source data from the Internet. The searches on the Internet for the SKUs are segregated into Hits and No Hits based on whether results are obtained or not. The data will be populated after the search on the Internet is done using auto crawl. The input data may have certain sets of attributes that may be missing in order to correct those anomalies, the non-source enrichment attempts to enrich the input data using varied data sources present on the Internet. This process entails searching the Internet for the MFR-MPN match and displaying the findings thereby to analyze and either enriches the data attributes with the ones found on the web or to bypass the web-found attributes and retain the source information. The user is able to specify the least percentage of attribute values that should be present.

The Internet search depends upon the criteria user set for the percentage of attribute values to be present. For example, if all attribute values are present for an item, then a search for that item on the Internet may be redundant. Hence, it is important to analyze the minimum percentage of attribute values that may be required to generate optimum short and long descriptions. In cases where descriptions generated from 60% attribute values suffice, a search for SKUs with less than 60% attribute values is adequate.

For example, if an item that has eight attributes and five attribute values, i.e., more than 60% is enough to generate a description per your requirements, then searching all other SKUs with less than 60% attribute values present should give the user relevant results for enrichment of SKUs. In order to access the non-source enrichment page, the user may click non-source enrichment in the flowchart of stages.

As shown in FIG. 4, data enrichment by categories showing all SKUs segregated category wise, as well as the percentage of attributes values present. Therefore, searching the total number of SKUs returns the number of SKUs having MFR-MPN match and also whether the search on the Internet results in any hits. The user is able to enrich the SKUs with attribute values found from the Internet. Therefore, the results that are directly obtained on classified as hits and results obtained that do not directly return attribute based values are classified as no hits.

Thus, the number of SKUs with MFR-MPN based Hits show the number of SKUs, wherein the MFR-MPN based search has returned attribute based results. Similarly, the number of SKUs has MFR-MPN but no Hits show the number of SKUs, wherein the MFR-MPN match exists but the MFR-MPN based search has not returned any relevant results and the non-source enriched SKUs shows the number of SKUs that have been enriched using the attribute values found from the Internet.

As shown in FIG. 5, wherein the enriched results with its attribute values on that website, these values could be used as a web attribute value for the record to be enriched.

As shown in FIG. 6, the user is able to view the records that have the same MFR-MPN match are affected and records that have been enriched are denoted by the symbol ● and the ones that are bypassed are denoted by the symbol ●. Pending (e.g., neither bypassed nor enriched) records are denoted by the symbol ●.

As shown in FIG. 7, an illustrative schematic flow is shown of data/information received by the computer through its input device and the data/information received by the user through the output device. I/O devices are usually hardware devices that are used to feed and/or receive data/information from the computer either through its memory or from the servers to which the computer is connected via router-modem combination. These servers can be provided to the users under the safe environment through the various security walls that does not allows the unauthorized access of the data outside the network.

The input devices (e.g., monitor, keyboard, mouse, mobile device and/or the like) accept the data/instruction fed by the user which is received by the memory. The data that is received by the computer is in binary form. The memory forwards it to the central processing unit (CPU) for processing the data/information received and convert it into a machine-readable form. The information converted is stored in the memory of the computer. This information is converted into a human-readable form and is accessible through output devices (e.g., monitor, keyboard, mouse, mobile device and/or the like). The same data/information can be further stored on the server through the local area network (LAN) of that computer. The data/information can be shared among various devices sharing the same LAN. A router allows the connection between the LAN and the various devices under the same network. The modem further allows the connections with the Internet thus connecting these devices to the server. The data/information stored on the server can be accessed through such an Internet connection and can be shared on various devices under one LAN. All this information is accessible through the output device/unit of the computer. A number of servers can be connected to one LAN through one router-modem combination and a number of LAN's can be connected to one server through a number of router-modem combinations. The flow of data/information is a two-way flow through the I/O devices. When received in the binary form it is processed by the processor and made available to the user. The same is with the data/information stored or retrieved from the server.

While the present invention has been described herein as relating to a suite of web-based applications with appropriate software layering to database repositories (that may constitute hard drives, tape drives, etc.), the data harmonization need not necessarily be a web application and instead may use another user interface-based application suite integrated with the underlying data repositories. The data harmonization also need not be located in one particular region; instead, and depending on the implementation, a business entity may distribute the harmonization functionality and available among a plurality of geographical areas.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld or mobile device (e.g., a tablet computer, a personal digital assistant "PDA", a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

As used herein, the term "mobile device" is intended to encompass any form of programmable computing device as may exist, or will be developed in the future, that implements a communication module for wireless voice and data communications, including, for example, cellular telephones, personal data assistants (PDA's), palm-top computers, laptop, and notebook computers, wireless electronic mail receivers (e.g., the BLACKBERRY™ and TREO™ devices), multimedia Internet enabled cellular telephones (e.g., the BLACKBERRY STORM™, and similar personal electronic devices that include a wireless communication module, processor and memory.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, etc.) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for harmonizing material master data, comprising:
   a computer hard drive;
   a processor unit operably associated with the computer hard drive; and
   a non-transitory computer readable medium storing instructions executable by the processor unit;
   the non-transitory computer readable medium including:
      an attribute extraction sub-system;
      an attribute quality check sub-system;
      a non-source enrichment sub-system; and
      a data enrichment sub-system;
   wherein enriched results, with attribute values for harmonization of data with dependencies including data classification and manufacturer part number (MFR-MPN) extraction, are not dependent on any other stage;

wherein the attribute extraction sub-system shows the number of total items denoted as a stock keeping unit (SKU), along with a number of categories having a percentage of SKUs for which the attribute values have been extracted and for those that are un-extracted;

wherein the attribute extraction sub-system extracts and displays attributes of an item that are for generating an enriched description by harmonizing and enabling scanning of short and long descriptions along with relevant input data fields specified during importation of the batch data and specifying criteria to extract attributes;

wherein the data enrichment sub-system enables enrichment of the SKUs with the attribute values found from the Internet, thereby the results that are directly obtained on searching the MFR-MPN match are classified as hits, wherein the hits are displayed on a screen and indicated by a first symbol, and results obtained that do not directly return attribute based values are classified as no hits, wherein the no hits are displayed on the screen and indicated by a second symbol.

2. The system for harmonizing material master data as claimed in claim 1, wherein the attribute quality check sub-system enables a user to define checks such that, if the attribute values are not extracted for certain attributes, the user can specify those attribute values from a record or by entering them manually in an attribute table on a right side, wherein the attribute values that the user specifies for an attribute from the record are applied to the attribute table in either batch wise, wherein the attribute values are added to the attribute table for all available batches or by category wise, wherein the attribute values are added to the attribute table for a relevant category or by record wise, wherein the attribute values are added to the attribute table only for a respective record.

3. The system for harmonizing material master data as claimed in claim 1, wherein, in order to specify the attribute values, a required text is selected from a description field required for extraction including a short description, whereby adding an attribute to a given table causes a pop up to be displayed that has all attributes that are defined for a data sheet to which the value is be added, in either of batch, category and record ways.

4. The system for harmonizing material master data as claimed in claim 1, wherein the non-source enrichment sub-system enables enrichment of the input data using multiple data sources present on the Internet by searching the Internet for a MFR-MPN match and displaying the findings thereby to analyze and either enrich the data attributes with the ones found on the Internet or to bypass the Internet-found attributes and retain the source information.

5. The system for harmonizing material master data as claimed in claim 1, wherein the number of SKUs with MFR-MPN based hits show the number of SKUs, whereas the MFR-MPN based search has returned attribute based results similarly, the number of SKUs has MFR-MPN but no hits show the number of SKUs, wherein the MFR-MPN match exists but the MFR-MPN based search has not returned any relevant results and the non-source enriched SKUs shows the number of SKUs that have been enriched using the attribute values found from the Internet.

6. The system for harmonizing material master data as claimed in claim 1, wherein the enriched results, with the attribute values on a website are used as a web attribute value for the record to be enriched, thereby a user is able to view the records that have the same MFR-MPN match are affected and records that have been enriched.

* * * * *